United States Patent [19]

Ditsler

[11] 4,265,576

[45] May 5, 1981

[54] MILLING MACHINE SYSTEM

[75] Inventor: Erwin P. Ditsler, Diamond Bar, Calif.

[73] Assignee: Textron Inc., Providence, R.I.

[21] Appl. No.: 70,006

[22] Filed: Aug. 27, 1979

[51] Int. Cl.³ .............................................. B23Q 35/16
[52] U.S. Cl. .................................. 409/129; 137/270; 251/3
[58] Field of Search ...................... 409/101, 114, 129; 251/3; 137/270

[56] References Cited

U.S. PATENT DOCUMENTS

| 2,753,145 | 7/1956 | Rosebrook | 409/129 X |
| 2,835,466 | 5/1958 | Rosebrook | 251/3 |
| 3,186,425 | 6/1965 | Weaver | 137/270 |
| 3,459,402 | 8/1969 | Weaver | 251/3 |
| 3,620,499 | 11/1971 | Rombeck | 251/3 |

*Primary Examiner*—Z. R. Bilinsky
*Attorney, Agent, or Firm*—Donald D. Mon

[57] ABSTRACT

A multiple-mode hydraulic tracer valve which is convertible from mode to mode by the use of a shiftable stylus and a transmission whose locus can be shifted relative to the spool valves of the tracer valve without changing the relative settings between the spools and the sleeves of the spool valves.

12 Claims, 3 Drawing Figures

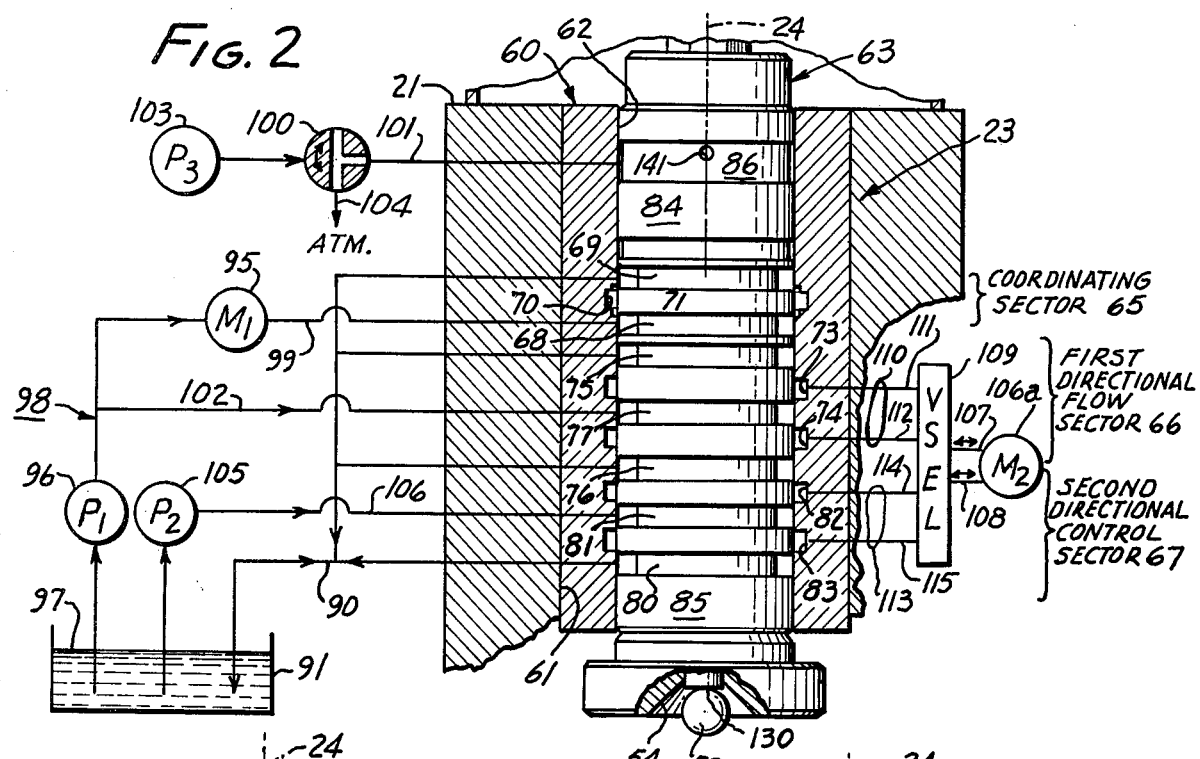
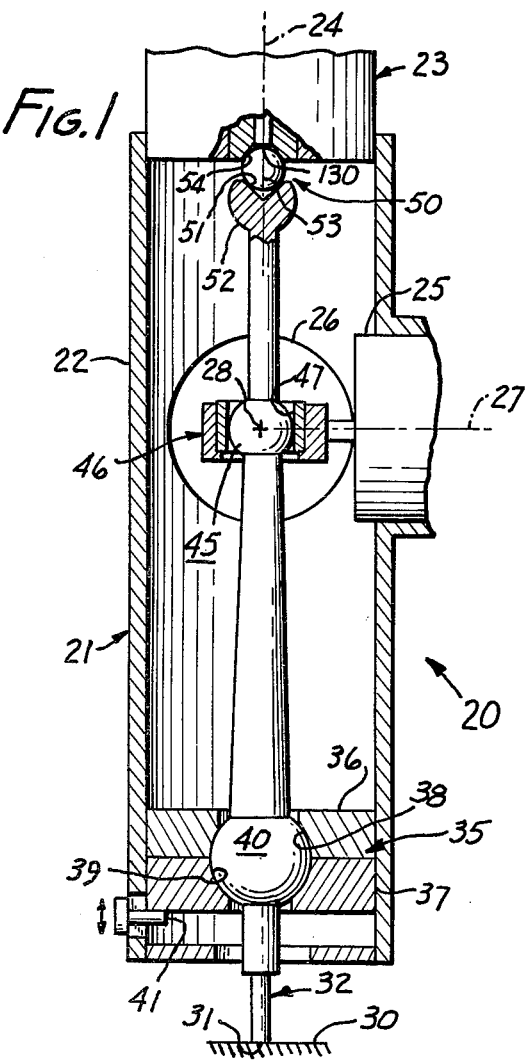
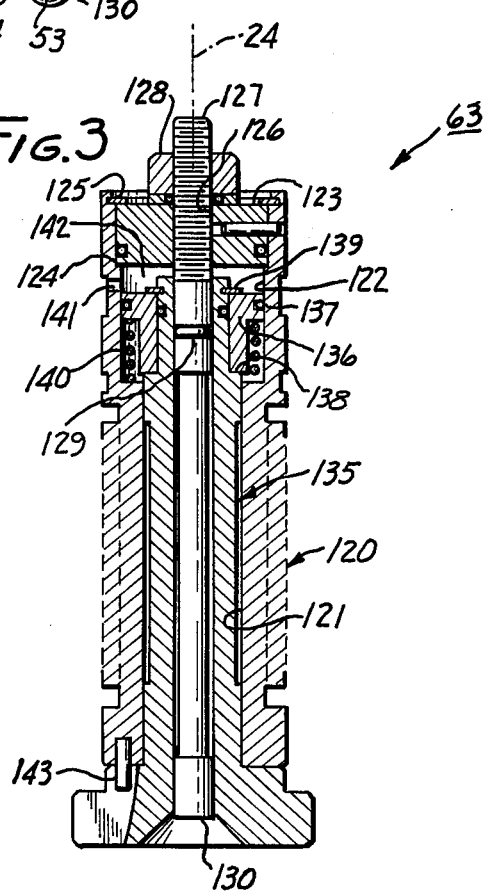

MILLING MACHINE SYSTEM

FIELD OF THE INVENTION

This invention relates to machine tool controls of the tracer valve type, and particularly to a tracer valve which can be utilized as a control in several different modes of operation.

BACKGROUND OF THE INVENTION

Tracer valves are well known in the machine tool field. Basically they comprise spool valves whose control position is responsive to the reaction between a stylus of the valve and a pattern or template. The pattern or template is related to a workpiece in which the profile of the pattern or template is to be duplicated by a cutting tool. The tracer valves control the operation of motors which cause appropriate machine movements to occur.

Tracer valves and their various modes of operation are fully described in Paul J. Weaver U.S. Pat. No. 3,186,425 issued June 1, 1965. This Weaver patent is incorporated herein in its entirety for its showing of tracer valve construction and operation, and for its showing of certain problems in the prior art.

Conventional tracer valves provide for control over one or more axes of motion of the machine tool. In one common variety, three dimensional tracing is enabled wherein three orthogonally related single axis spool valves are adjusted by the stylus so as to control operation of three motors which drive machine tool components along respective axes. The mode involved is called "3D" tracing. A sub-species of this type is two-axis control, and this mode is frequently called "360°" tracing. 360° tracing can be accomplished with a 3D tracer valve by disabling one of its three valves.

Still another mode of tracing operation is called "coordinated" tracing, wherein one sector of a single spool valve controls bi-directional movement along one axis, and another sector of the valve controls the rate of motion along an axis perpendicular to the first axis. In this mode of tracing, when velocity increases along one axis it slows along the other.

These foregoing modes are fully described and discussed in the said Weaver patent, and also in Rosebrook U.S. Pat. Nos. 2,753,145 and 2,835,466 issued July 3, 1956 and May 20, 1958, respectively, which are also incorporated herein by reference for their showing of structural and functional parts of such valves.

It has long been an objective to be able to utilize a single valve construction for as many modes of tracing as possible. The said Weaver patent does provide optimim versatility in a hydraulic tracer valve. It enables 360°, 3D, and coordinated tracing to be accomplished with only one valve. However, this valve has not become popular, because when converting from 3D or 360° tracing to coordinated tracing, or vice versa, it is necessary to make too many adjustments to parts of the valve. It is an object of this invention to improve upon the valve shown in the said Weaver patent, and to simplify the conversion procedure in such a way that the spool valves themselves do not have to be repositioned or adjusted. There results an optimum valve with simple multiple mode convertibility.

A valve according to this invention includes a first spool valve intended to be aligned along a vertical axis. The valve includes a body which supports a stylus. The stylus has a first ball-like member which mounts it for universal pivotal motion, that is to say, the stylus tip may swing in all directions from the axis of the stylus. This first ball-like member is mounted in a first ball seat so the entire stylus is vertically moveable along said axis. The stylus includes a second ball-like member to which is mounted a scotch yoke that transmits lateral movement to a pair of orthogonally oriented, horizontal spool valves which exert control along their respective axes. A transmission is carried at the top of the stylus. The transmission includes a ball which is seated in a conical recess in the top of the stylus. This ball is confronted by and supports the bottom of a spool of the vertically mounted first valve. This support is by way of a conical recess, or a flat conversion surface. The spool includes conventional external grooves and lands which cooperate with respective grooves and lands in an encircling sleeve to provide control for flow of hydraulic fluid to cause appropriate machine tool movements. The conical recess carried by the spool is mounted to a plunger, which enables it to be shifted axially relative to the conversion surface.

According to a preferred but optional feature of this invention, the spool and sleeve of said first spool valve includes grooves and lands respective to a first and a second control mode, as well as to a coordinating sector used with one of said modes.

The above and other features of this invention will be fully understood from the following detailed description and the accompanying drawings, in which:

FIG. 1 is a semi-schematic fragmentary view showing a major portion of a tracer valve according to this invention;

FIG. 2 is an enlarged view, partly in axial cutaway cross-section and partly in schematic notation, showing certain details of the first spool valve herein; and FIG. 3 is a view principally in axial cutaway cross-section, showing further details of the spool valve of FIG. 2.

FIG. 1 shows the general scheme of a tracer valve 20 according to the invention. Full details of this class of valve will be found in the said Weaver patent, and will not be repeated here. Instead only those parts essential to an understanding of the instant invention will be described in detail, and some of those only schematically.

Tracer valve 20 includes a body 21 with a wall 22 which supports the various parts. It includes a first spool valve 23 which controls motion along a first axis 24, this axis being vertical when the valve is installed. Second and third spool valves 25, 26 have axes 27, 28 which are horizontal, and orthogonal to each other and to axis 24. Spool valves 25 and 26 are conventional four-way spool valves for use on horizontal motors. U.S. Pat. Nos. 3,459,402, issued to Weaver on Aug. 5, 1969 and 3,620,499, issued to Rombeck on Jan. 6, 1970 show suitable valves. These patents are incorporated herein by reference for their showings of such valves. These valves are intended to determine the flow of pressurized fluid to respective motors (not shown) in order to control machine tool motions along axes 27 and 28, respectively. The motors controlled by spool valve 23 will be described in detail later because of their pertinence to the spool valve 23.

The function of the tracer valve is, when mounted to the one part of a machine tool (now shown), to react with a pattern or template 30 that is mounted to another part of the machine tool. The relative movements between the pattern or template and a tip 31 of a stylus 32 will cause operation of motors to shift the parts of the machine tool relative to each other so as to cause identical relative movement of a cutter mounted to one of the parts and a workpiece mounted to the other, and thereby cut in the workpiece a contour which duplicates that of the pattern or template. This is conventional tracer valve operation.

Stylus 32 is mounted to the body by means of a first mounting means 35, which is shown schematically as being formed from two portions 36, 37 with embracing surfaces 38, 39 that form a socket. These embracing surfaces trap a first ball-like member 40 which is incorporated in the stylus at a location along its length spaced from the tip. The parts of the mount are joined by means (not shown) which hold them together to trap the first ball-like member. The mount is movable up and down as a unit. Adjustment means 41 adjustably limits the downward excursion of the mount for a purpose later to be described. Suffice it to say that the mount, however it is constructed, permits rotation of the ball so as to enable the tip of the stylus to pivot universally, which is to say that the tip of the stylus can move in all lateral directions away from the axis 24. This is a consequence of the rotational freedom of the first ball-like member. The mount also has limited downward and upward movement so that the first ball-like member and the stylus move down and up with it.

A second ball-like member 45 is incorporated in the length of the stylus at a location spaced from the first ball-like member. The second ball-like member is embraced by a second mounting means 46 in the form of the familiar "scotch yoke". This also is shown in detail in the Weaver patent, and in Rosebrook U.S. Pat. No. 2,753,145. The purpose of the scotch yoke is to permit free vertical movement of the second ball-like member in a cylindrical wall 47 and to couple the spools of the second and third spool valves to the yoke so as to adjust them in accordance with the component of lateral movement of the second ball-like member in the direction of their axes, which occurs as a consequence of tilting movement of the stylus. Up and down movement of the stylus does not cause appreciable movement of the horizontal spools in the second and third spool valves.

A transmission member 50 is provided at the top of the stylus. It includes a conical recess with a conical surface 51 in the upper end of an enlarged portion 52 of the stylus. Preferably this recess is a cone with a 90° included angle. The transmission member also includes a ball 53 which sits in the conical recess, the ball facing upwardly toward spool valve 23.

The transmission further includes a second conical recess with a conical surface 54, which faces downwardly. Surface 54 also preferably has a 90° included angle, and is carried by the spool of the first spool valve. The term "conical" includes the term "frusto-conical".

It will now be seen that movement of the stylus will cause the transmission to exert force on the first spool valve to position the spool, as will later be described in greater detail.

The construction of the first spool valve and its relationship to the stylus and the transmission will now be described.

FIG. 2 shows first spool valve 23 in greater detail. It is located at the top of body 21 and includes a pressed-in sleeve 60 which fits within a cylindrical cavity 61 in the body itself. The body and the sleeve will be appropriately ported, as will later be described. The sleeve forms an internal circularly cylindrical spool passage 62 which is adapted to receive spool 63 in close fitting fluid sealing relationship therewith. Spool 63 is circularly cylindrical and is adapted to reciprocate along first axis 24. The term "cylindrical" is used in connection with the spool passage and the exterior surface of the spool. It will be understood that this relates to the various lands and cylindrical surfaces which make contact with the opposing spool or sleeve. The grooves constitute interruptions in an otherwise-cylindrical surface. Persons skilled in the art will notice that grooves are provided for a coordinating sector 65, a first directional flow sector 66, and a second directional flow sector 67. Full details of such sectors will be found in the said Weaver patent, and will be only briefly described herein.

Coordinating sector 65 comprises an inlet and an outlet groove 68, 69, respectively, which extend circumferentially around the spool. The sleeve includes a by-pass groove 70 which confronts land 71 on the spool between grooves 68 and 69. The grooves in this and in the other sectors form respective control edges and may, or may not have appropriate notches (not shown), all as described in said Weaver patent. Suffice it to say that the coordinating sector is shown in its "null" condition wherein flow can occur at maximum rate from the inlet and outlet groove past the edges and through the by-pass groove. Should the spool be moved in either direction from this null position, one set of edges or the other will cause throttling or even a shut-off of fluid flow.

The first directional flow sector includes a first and a second motor groove 73, 74 formed in the sleeve. It further includes a first and a second exhaust groove 75, 76 and between them a pressure groove 77 in the spool, making the confrontations shown. Cylindrical lands are formed between the grooves, and control edges are formed at their junctions.

The second directional flow sector 67 shares exhaust groove 76 with the first coordinating sector and includes a second exhaust groove 80, and a pressure groove 81, all in the spool. The sleeve of this sector includes a first and a second motor groove 82, 83. Again, cylindrical lands are formed between the grooves, and their junctions with the grooves from control edges.

Sealing lands 84, 85 are provided above and below the sectors to prevent leakage of hydraulic fluid from the valve. In addition, a converter groove 86 is provided near the top of the spool.

The sleeve is appropriately pierced by ports which open into the spool passage where they will confront appropriate regions of the spool. An exhaust manifold 90 leads to all of the exhaust grooves. It returns exhaust hydraulic fluid to reservoir 91. A first motor 95 which is shown for use in the coordinating mode, receives pressurized fluid from a first pressure source 96 which withdraws fluid 97 from the reservoir and discharges it under positive pressure through a pressure manifold 98. Pressure manifold 98 provides fluid directly to the first motor. Fluid from the first motor is discharged through conduit 99 to inlet groove 68.

Pressure manifold 98 connects through conduitry 102 through the sleeve to where it will always confront pressure groove 77.

First motor 95 is actually a selected one of the motors which drives the machine tool along a selected horizontal axis. In the 3D mode, it will be one of the motors connected to valves 25 and 26. In the coordinating mode, one of those axes is controlled by the coordinating sector of the first spool valve, rather than by valve 25 or 26.

A second pressure source 105 discharges at an appropriate, usually higher, pressure through conduit 106 where it always will open into pressure groove 81 of the second directional flow sector. This completes the description of the supply and exhaust connections to the tracer valves.

Second motor 106a is supplied by conduits 107, 108 from a selector valve 109. This selector valve selects one or the other of two pairs of supply and exhaust conduits: pair 110 comprising conduits 111, 112, or pair 113 comprising conduits 114 or 115. It will connect either pair 110 or pair 113 to conduits 107, 108 as selected. The second motor will customarily be used to provide for vertical machine tool movement, while the first motor will customarily be utilized to control machine tool movement along a horizontal axis. Because conduitry further to support the above is mere routine, it will suffice to say that when any of these sectors is not in active use, valving will be provided such that it will be vented or looped in such a way that it will not impede the movement of the spool in the sleeve.

Pressure sources 96 and 105 provide liquid under pressure for motor actuation. A third pressure source 103 may provide either liquid or gas, and preferably will provide compressed air. It is supplied to a three-way selector valve 100 which is connected by conduit 101 to confront groove 86. The selector valve also has a vent 104 to atmosphere. The operation of the selector valve can be piloted by another valve, if desired.

At the top of the valve there may be provided counter-balancing means, and means for setting the bias force on the stylus. The details of these form no part of this invention, and may be found in the said Weaver patent.

The function of the spool and sleeve configuration in the first spool valve is to exert control over the first and second motors in various tracing modes. Also, a third motor may be controlled in 3D operation. Conduitry and selector valves not pertinent to this invention will be provided to select which of the horizontal axes is to be driven under control of sector 65, that is, to determine which of those motors is "M1", and in which direction driving motion occurs. Such circuitry is common knowledge in this art. There is, of course, a third motor, respective to the third axis. The first motor is exemplary of a selected one of the motors driving along either of the horizontal axes. The non-selected one is merely disabled during coordinated tracing. In 360° or 3D tracing, both horizontal motors will be connected to their respective second or third spool valve.

In order to convert from mode to mode, the spool is provided with apparatus enabling it readily to be set. This apparatus is shown in FIG. 3. Spool 63 is shown in this Fig., but its notches are not repeated, in order to simplify the drawing. Spool 63 includes an outer cylinder 120 with a central axial passage 121 which near its top forms a hydraulic cylinder 122. The upper end of cylinder 120 is closed by end plug 123 which is held in place between an internal shoulder 124 and a snap-ring 125. Appropriate O-ring seals are provided. A central internally threaded hole 126 in the end plug threadedly receives converter rod 127 whose axial position can be adjusted by turning it in the thread. It will be held in its adjusted position by lock nut 128. The external surface of this rod at its upper end is cylindrical and smooth. It carries a ring seal 129. The rod extends downwardly and terminates in a converter surface 130 which is flat and normal to the axis of the valve.

A converter plunger 135 is annular, and fits in the annular space between the converter rod and the inside wall of outer cylinder 120. This is an annular plunger which at its upper end carries a piston head 136. The piston head, by means of an O-ring 137, makes a fluid sealing sliding fit with the wall of hydraulic cylinder 122. It is restrained to the body of the plunger between a shoulder 138 and a snap ring 139.

A bias spring 140 presses upwardly against the piston head and downwardly against the outer cylinder thereby to bias the converter plunger towards an upper position. The conical surface is drawn upwardly, which enables the planar converter surface to enter the space within said surface 54, and the ball will bear against the planar surface.

A pressure port 141 extends from converter groove 86 to hydraulic cylinder 122 to receive pressurized fluid through selector valve 100 or to enable it to be vented by valve 100. It will thereby be seen that when pressure is off in region 142 above the piston, the bias means will move the converter plunger to the illustrated upper position. Compressed air is more practical than hydraulic fluid for this function, although a pressurized liquid could, of course, be used instead of gas. When pressure is exerted in region 142, the converter plunger is pressed downwardly to a lowermost position determined by the permissible length of the stroke of the plunger. This has the effect of moving the second conical recess to a position where the ball cannot reach the planar converter surface, and the ball will bear against conical surface 54. A dowel pin 143 joins the converter plunger and the outer cylinder in a manner permitting them to slide axially relative to one another but constraining them for concurrent rotation. It will be observed that the converter rod and the outer cylinder are in effect one body, and that the conversion operation yet to be described is merely the consequence of the axial shifting of the converter plunger, which either retracts the conical surface so as to permit the ball to contact converter surface 130, or extends the conical surface so that the ball contacts it, and not the converter surface. In the first case, the converter surface is operatively contacted by the ball, and in the second case it is not, and the mode is coordinated tracing.

The operation of this tracer valve is as follows. Valve 100 vents groove 86 to atmosphere, and the bias means forces the plunger to the illustrated position for 3D tracing. With the device in the indicated condition, the ball will, within the permissible relatively limited swing of the stylus make contact only with converter surface 130. This will directly transmit to spool 63 the up and down movement of the stylus. There will be no appreciable shifting of the spool in the sleeve as the consequence of tilting the stylus, the angle of stylus rotation being so small. This is the 3D mode. It utilizes the second pressure source for supplying motor 106a. The other two motors are supplied by the same source. In the usual operation a higher pressure is used in 3D operations than in coordinated operations. In the 3D mode, conduit pair 113 is connected to the second motor. The spool valve arrangement is as indicated, with the stylus in its vertical axially aligned condition, and the valve set at "null" by virtue of equilibrium contact between the stylus and the pattern or template. Thereafter, three-dimensional movement of the system is entirely in accordance with that described in the Weaver patent, when the spool tilts, and/or moves up or down. The mount 35 is adjusted by means 41 to permit limited downward movement of the stylus from null, and this determines the maximum plunge-cut rate. The other two motors respond to their respective horizontal spool valve.

When it is desired to convert the tracer valve to coordinated tracing, pair 110 is connected to the second motor. At this time, selector valve 100 is turned so that it does not vent the converter groove 86, but instead connects it to the third pressure source 103. The pressure in region 142 will overcome the bias force and cause the converter plunger to move downwardly. It moves the upper conical surface 54 down sufficiently far relative to the converter surface that the ball cannot operatively contact converter surface 130. At the null condition, the ball makes full peripheral contact with both of the conical sections. Tilting of the stylus will cause the ball to ride up the sides of the conical surfaces, and cause upward movement of the spool. This will result in relative movement in the coordinating sector and in the first directional flow sector, entirely in accordance with known techniques. Also, direct upward movement of the stylus will cause that spool movement. The mount enables the stylus to move downwardly from the illustrated "null" position to enable a limited rate of plunge cut. The tracer valve now exerts all control through the first spool valve (on two motors). The other two spool valves, and the unused motor are disabled.

In both modes, the spool is supported by the stylus through the transmission member.

What will now be observed is that a different pressure can readily be applied to the different directional flow sectors which are appropriate to the mode being utilized. Also, instead of using the same directional flow sector for the two modes, a directional sector can be provided for each. Then the control edges can be tailored to suit the respective needs of the different modes without compromise, and the pressure to be used is not limited to the least effective of the two. Furthermore, it will be observed that at the time that the sleeve and spool were ground, all of the sectors were ground at their respective nulls in the same spool and sleeve. When the shift is made from one mode to another, it is necessary to "reset" the stylus at a different elevation. When this was done in the Weaver patent and the converter surface was moved relative to the spool grooves, a complete resetting operation was required. With this invention, the movement of the converter plunger and the movement of the stylus are coordinated so that the valve remains on null and only the plunger and stylus move relative to the grooves. Therefore resetting this valve only requires the exertion of pressure to move the converter plunger, and adjustment of the permissible plunge of the stylus by adjusting means 41. This is a great simplification. Means 41 will generally be a threaded adjustment for adjustably determining the lower-most permissible elevation of the stylus relative to the body. The Weaver patent shows an entirely suitable adjustable mount in detail. Usually, rate control means will be provided which limit the angular tilt of the stylus. They are readily adapted to this tracer valve. The Weaver patent shows one suitable type.

Pilot systems and electrical control systems can be provided to achieve the appropriate setting of the illustrated and other valves and conduits, so that an elegantly simple control panel can be presented to the operator. However, these form no part of the invention and are therefore not illustrated.

360° mode tracing merely involves disabling one of the three spool valves, usually the first spool valve (vertical). This tracer valve can readily be adapted to automatic tracing, wherein a lateral bias force is applied to the stylus, causing it to tilt and seek to follow the contour of the pattern or stylus in the 3D or 360° mode. The coordinating mode involves driving the first motor in a selected direction, while the contour is determined by the up and down movement under control sector, which causes the second motor to operate. When the second motor speeds up or slows down, the first motor does the opposite, so that the movement of the cutter along the workpiece is at a substantially constant velocity.

Ths invention is not to be limited to the embodiment shown in the drawings and described in the description which is given by way of example and not of limitation, but only in accordance with the scope of the appended claims.

I claim:

1. In a multiple-mode tracer valve for simultaneously controlling the operation of a plurality of motors in order to drive machine tool components along selected ones of three orthogonally related axes, said tracer valve including body, a first, second and third spool valve, a stylus having a central axis, a tip, and a dimension of length, first mounting means mounting said stylus at a first location spaced from said tip along its length, whereby said stylus can be shifted axially and also said tip can be deflected in any lateral direction relative to said axis, adjustment means for adjusting said first mounting means adjustably to determine the lowermost permissible position of the stylus, second mounting means coupling said stylus to said second and third spool valves at a second location along its length to shift the spools of said second and third spool valves along their respective axes by distances proportional to components of displacement of the stylus tip along said axes, and to permit free vertical movement of said stylus, the improvement comprising:

said first spool valve comprising a cylindrical first sleeve and a cylindrical first spool slidably fitted in said sleeve, said spool and sleeve having a common axis, said axis being aligned with said axis of said stylus when said stylus is in a centralized position, said first sleeve and said first spool having grooves and lands to form a coordinating sector, a first directional control sector, and a second directional control sector, said spool valve being ported to supply and receive fluid to and from motors at regulated and directionally selected rates and to receive pressurized fluid, and to pass fluid to exhaust; and a transmission interposed between said first spool and said stylus, said transmission comprising a first conical surface in the end of said stylus adjacent to and opening toward said first spool, a ball resting on said first conical surface, a rod having a planar converter surface on its end facing said ball normal to said first axis, said rod being rigidly fixed to said spool, a converter plunger axially slidably mounted in said first spool surrounding said rod, a second conical surface opening toward said ball, converter means for shifting said converter plunger to a position where the ball can bear against said converter surface, or to a position where said ball bears against said second conical surface but not against said converter surface, and converter means to shift said converter plunger to a selected one of said positions.

2. Apparatus according to claim 1 in which said converter means comprises a hydraulic cylinder in said first spool, a piston head on said converter plunger, bias means biasing said plunger to one of said positions, and conduitry adapted to supply fluid under pressure to the region on the opposite side of said piston head which is in opposition to said bias means.

3. Apparatus according to claim 2 in which said converter means further includes a selector valve adapted selectively to apply pressurized fluid to said region, or to vent said region.

4. Apparatus according to claim 2 in which said bias means comprises a spring.

5. Apparatus according to claim 4 in which said converter means further includes a selector valve adapted selectively to apply pressurized fluid to said region, or to vent said region.

6. Apparatus according to claim 1 in which said coordinating sector includes a pair of axially spaced apart grooves in one of said first spool or first sleeve, and a groove in said other, said last named groove underlapping the adjacent edge of each of said other two grooves when said first spool is in its null position.

7. Apparatus according to claim 1 in which each of said directional control sectors comprises a four-way valve, wherein one of said first spool or first sleeve includes a pair of motor supply grooves adapted to be connected to a motor, and the other includes a pair of exhaust grooves and a pressure groove, lands adjacent to at least some of said grooves overlapping when said first spool valve is in its null position to prevent flow of fluid to and from a motor connected to said motor supply grooves.

8. Apparatus according to claim 7 in which said coordinating sector includes a pair of axially spaced apart grooves in one of said first spool or first sleeve, and a groove in said other, said last named groove underlapping the adjacent edge of each of said other two grooves when said first spool is in its null position.

9. Apparatus according to claim 8 in which said converter means comprises a hydraulic cylinder in said first spool, a piston head on said converter plunger, bias means biasing said plunger to one of said positions, and conduitry adapted to supply fluid under pressure to the region on the opposite side of said piston head which is in opposition to said bias means.

10. Apparatus according to claim 9 in which said converter means further includes a selector valve adapted selectively to apply pressurized fluid to said region, or to vent said region.

11. Apparatus according to claim 10 in which said bias means comprises a spring.

12. In combination with a tracer valve according to claim 1, selector valve means for selecting which of said directional control sectors controls a motor respective to said axis of said first spool valve.

* * * * *